(12) United States Patent
Lindhart

(10) Patent No.: US 11,667,450 B2
(45) Date of Patent: Jun. 6, 2023

(54) APPARATUS, METHODS AND SYSTEM FOR ABSORBING SHOCK AND CARRYING ELECTRONIC EQUIPMENT

(71) Applicant: Eric Lindhart, Lake Placid, FL (US)

(72) Inventor: Eric Lindhart, Lake Placid, FL (US)

(*) Notice: Subject to any disclaimer, the term of this patent is extended or adjusted under 35 U.S.C. 154(b) by 111 days.

(21) Appl. No.: 17/142,521

(22) Filed: Jan. 6, 2021

(65) Prior Publication Data

US 2022/0041363 A1     Feb. 10, 2022

Related U.S. Application Data

(60) Provisional application No. 63/063,772, filed on Aug. 10, 2020.

(51) Int. Cl.
*B65D 81/02* (2006.01)
*H02S 10/40* (2014.01)
(Continued)

(52) U.S. Cl.
CPC ........... *B65D 81/022* (2013.01); *B65D 25/08* (2013.01); *B65D 25/32* (2013.01); *B65D 85/68* (2013.01);
(Continued)

(58) Field of Classification Search
CPC .............. B65D 81/05; B65D 81/051–133
See application file for complete search history.

(56) References Cited

U.S. PATENT DOCUMENTS 3,227,504 A * 1/1966 Dunham ................. B42F 17/02
                                                    220/532
5,806,740 A    9/1998 Konishi et al.
(Continued)

FOREIGN PATENT DOCUMENTS

CN       1026663 B       11/1994
KR     102334218 B1  *   7/2013
WO    2018049706 A1      3/2018

OTHER PUBLICATIONS

Article These Portable Solar Panels Fit In A Bucket And Assemble In 2 Minutes, published Sep. 22, 2016 authored by Adele Peters, on the Website Fast Company, https://www.fastcompany.com/3063918/these-portable-solar-panels-fit-in-a-bucket-and-assemble-in-two-minutes; 2016 (Year: 2016).*
(Continued)

*Primary Examiner* — Mollie Impink
(74) *Attorney, Agent, or Firm* — Derek Fahey, Esq.; The IP Plus Firm, PLLC

(57) ABSTRACT

The disclosure concerns a portable system for absorbing shock and carrying electronic equipment. The system includes a container having an open end, a closed end, and an interior wall. The system includes at least one first standoff attached to a first interior wall portion and at least one second standoff attached to a second interior wall portion such that the first and second standoff oppose each other. The system includes at least one piece of electronic equipment attached to a plate. The plate includes a rail. Each standoff also has a groove to receive the rail. The system further includes a relief section defined by an area between the interior wall of the container and at least one of a perimeter of the plate and a perimeter of the electronic equipment. The system also includes shock absorbing properties to protect the electronic equipment from damage.

18 Claims, 14 Drawing Sheets

(51) Int. Cl.
   *B65D 85/68* (2006.01)
   *B65D 25/32* (2006.01)
   *B65D 25/08* (2006.01)

(52) U.S. Cl.
   CPC ...... *H02S 10/40* (2014.12); *B65D 2585/6897* (2013.01); *Y02E 10/50* (2013.01)

(56) References Cited

U.S. PATENT DOCUMENTS

| | | | |
|---|---|---|---|
| 7,946,418 B1 * | 5/2011 | Cerynik | B25H 3/021 |
| | | | 206/362 |
| 8,203,237 B1 * | 6/2012 | Cowles | H02S 20/30 |
| | | | 307/150 |
| 9,876,522 B2 | 1/2018 | Huang et al. | |
| 10,461,289 B2 | 10/2019 | Thiel et al. | |
| 10,478,963 B1 * | 11/2019 | Workman | A45C 13/023 |
| 11,342,780 B1 * | 5/2022 | Brown | H02J 7/35 |
| 2002/0027767 A1 | 5/2002 | Ryder | |
| 2004/0121225 A1 * | 6/2004 | Krieger | H02J 7/0045 |
| | | | 429/96 |
| 2011/0089078 A1 | 4/2011 | Ziemba | |
| 2011/0242744 A1 | 10/2011 | Klosky | |
| 2013/0220841 A1 | 8/2013 | Yang | |
| 2015/0200318 A1 | 7/2015 | Thiel | |
| 2016/0367017 A1 | 12/2016 | Adams et al. | |
| 2019/0373999 A1 * | 12/2019 | Nauertz | A45C 15/00 |

OTHER PUBLICATIONS

A video of the SoloPower bucket system can be seen at: https://www.youtube.com/watch?v=WkdAzX9R8CY; 2018 (Year: 2018).*

* cited by examiner

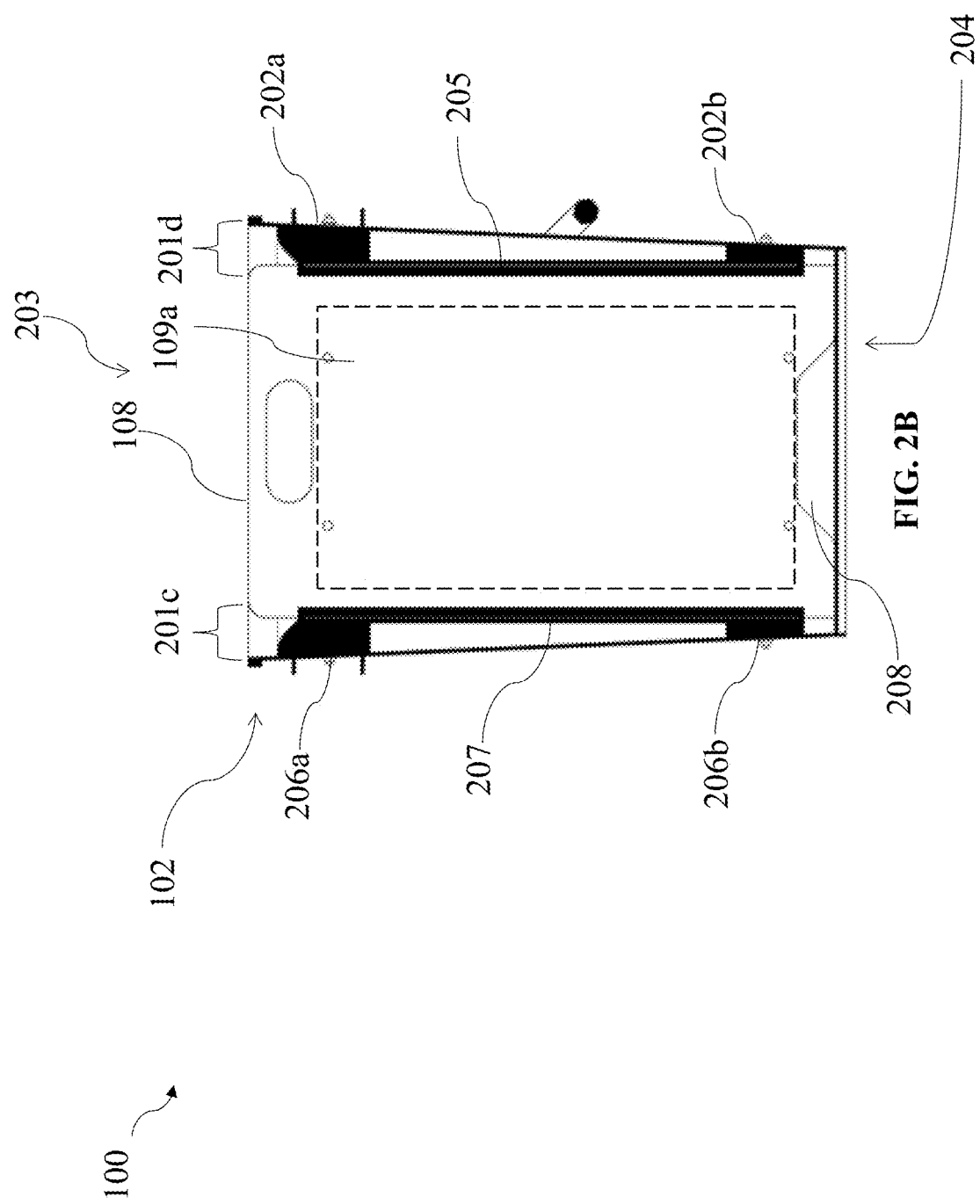

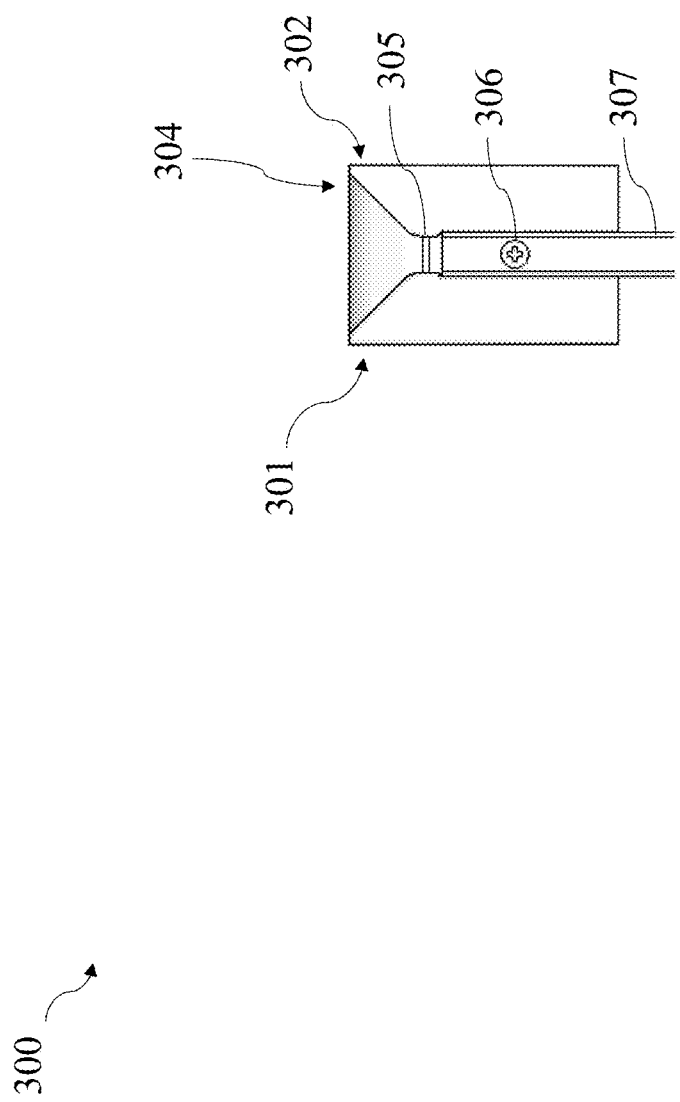

APPARATUS, METHODS AND SYSTEM FOR ABSORBING SHOCK AND CARRYING ELECTRONIC EQUIPMENT

CROSS-REFERENCE TO RELATED APPLICATIONS

This application claims the benefit of the filing date of U.S. Provisional Application Ser. No. 63/063,772 titled "APPARATUS, METHODS AND SYSTEM FOR ABSORBING SHOCK AND CARRYING ELECTRONIC EQUIPMENT" and filed Aug. 10, 2020 and the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of portable protective casings for electronic devices, and more specifically to the field of portable shock and impact absorbing protective casings for carrying electronic equipment.

BACKGROUND

Remote workers, field technicians, construction workers, and even the average consumer requires portable, protective casings to easily carry electronic equipment and protect the electronics from the natural elements and impact damage from everyday use. Often times electronic equipment will get tossed around in the bed of a truck, knocked over on the job, or even cause tripping hazards from exposed wires.

For example, a person venturing off on a camping trip in the woods may bring a power source for his or her electronic devices, and multiple other electronic devices including some electrical lanterns or even an electronic stove top. In the middle of the woods, the electronic devices will be exposed to the natural elements including water, heat, and dirt. These elements will damage the electronics and decrease the lifespan of the electronic devices.

Additionally, available power sources may be extremely limited in accessibility and portability. A heavy generator may need to be plugged in outside to grill food, and a phone may need to be charged inside a tent or down by a lake while fishing. Throughout these daily activities and traveling, the electronics are susceptible to constant damage. To provide power inside a tent or around a campground, a series of extension cords and wires may be exposed to the elements and cause tripping and fire hazards for the users. Extension cords are generally long, heavy, and often tangled; thus, extension cords lack portability in providing power. Construction workers or field technicians may need access to portable power on the job where running electrical lines or accessing electricity may be difficult.

To protect the physical casing of the electronic device itself, rubber casings and hard cases must be custom fit to each electronic device. These protective casings are costly for the consumer and are generally designed for aesthetics and light weight functionality. Each individual electronic device itself may be portable, but someone with many electronic devices may find it difficult to transport and protect the electronic devices all at once. The problem with many protective casings for electronic equipment, regardless of whether the electronic device is a power source, a phone, a drill, or any other electronic device, is that the protective equipment lacks the adequate protection consumers need to protect their devices from everyday usage and the elements of nature.

As a result, there exists a need for improvements over the prior art and more particularly for a more efficient way of absorbing shock and carrying electronic equipment.

SUMMARY

A system and method for absorbing shock and carrying electronic equipment is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a portable system for absorbing shock and carrying electronic equipment is disclosed. The system includes a container having an open end and closed end and having an interior wall inside the container. At least one first standoff is attached to a first interior wall portion and at least one second standoff is attached to a second interior wall portion such that the first standoff and second oppose each other. The system includes a plate on which at least one piece of equipment is attached and where the plate further includes a rail. Each standoff has a groove, where each groove is configured to receive the rail. The system further includes a relief section defined by an area between the interior wall of the container and at least one of a perimeter of the plate and a perimeter of the electronic equipment.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 2B is a cross-sectional front view of the system illustrating components of the system, according to an example embodiment;

FIG. 3A is a detailed front view of a first top standoff of the system, according to an example embodiment;

DETAILED DESCRIPTION

Figure 1A:
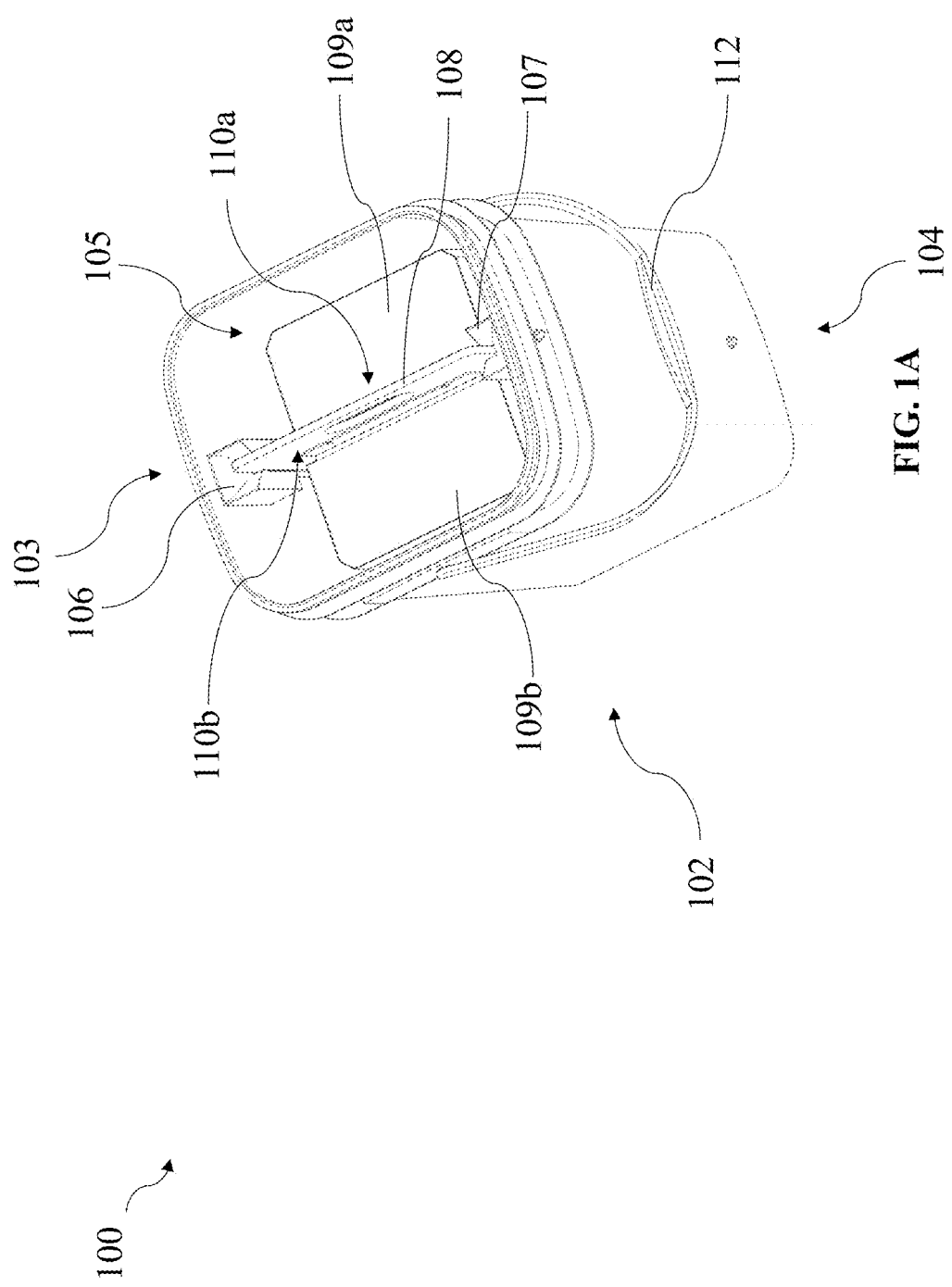
FIG. 1A is a perspective view of a portable system for absorbing shock and carrying equipment, according to one embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a portable system for absorbing and carrying electronic equipment. In one embodiment the system includes a container having an open end, a closed end, and an interior wall. At least one first standoff is attached to a first interior wall portion and at least one second standoff is attached to a second interior wall portion such that the first and second standoff oppose each other. At least one piece of equipment is attached to a plate. The plate having a rail. Each standoff also has a groove, where each groove is configured to receive the rail. The system further includes a relief section defined by an area between the interior wall of the container and at least one of a perimeter of the plate and a perimeter of the electronic equipment.

The relief section is to provide shock absorbing properties to protect the electronic equipment from damage while the equipment is secured to the plate. The system is portable and may include a lid closed configuration to protect the electronic devices. In other embodiments, the system includes absorbent properties in the carrying handle and the system includes a power source used to power on electronics portably where otherwise adequate power source options may be limited or unavailable.

Figure 1B:
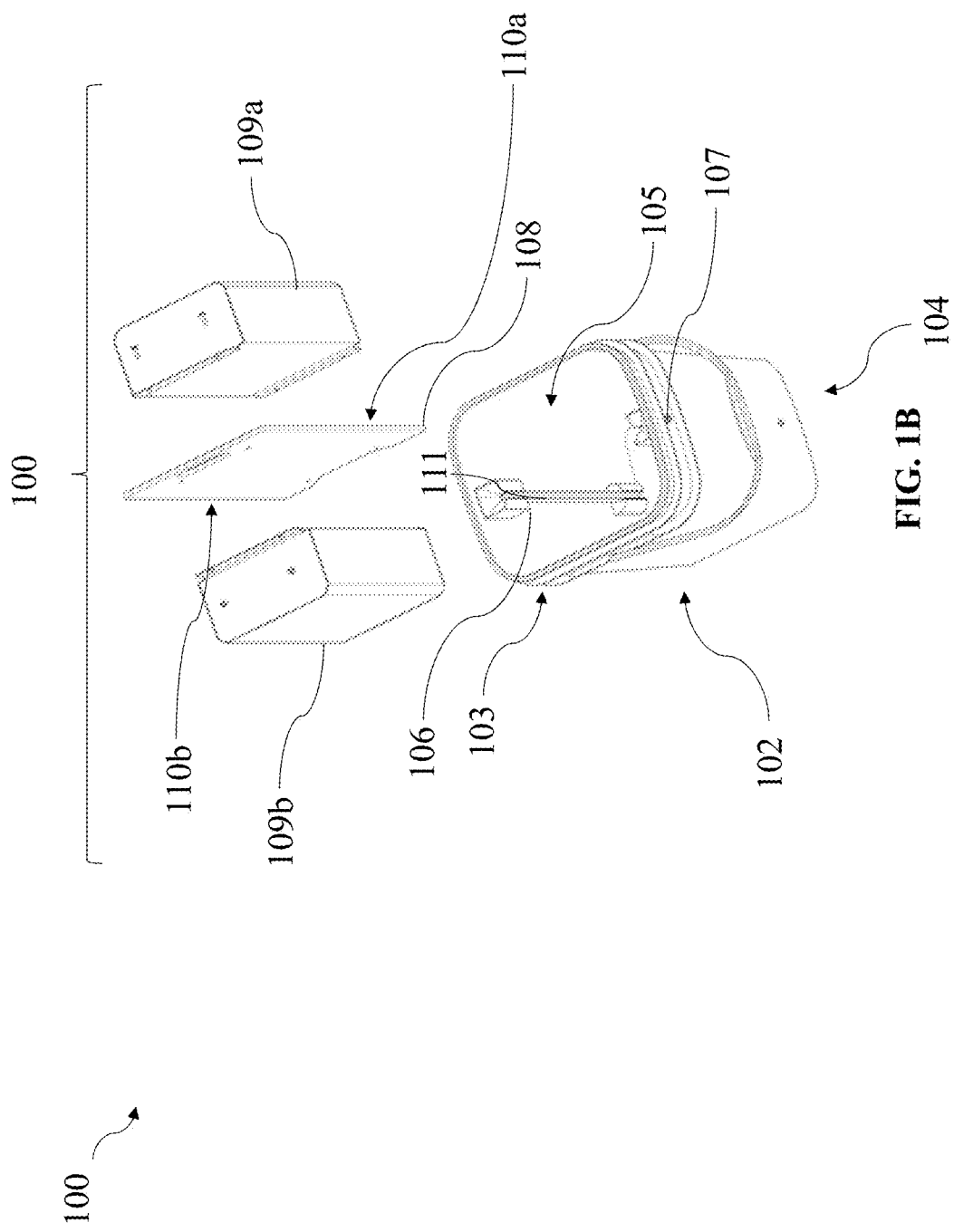
FIG. 1B is an exploded perspective view of the system, according to an example embodiment.

Referring now to FIGS. 1A and 1B, a perspective view (FIG. 1A) and an exploded view (FIG. 1B) of a portable system 100 for absorbing shock and carrying equipment according to one embodiment are illustrated. The portable system 100 includes a container 102 having an open end 103 and a closed end 104. In one embodiment, the container 102 is a bucket. However, other types of containers made of materials having shock absorbing properties may be used and are within the spirit and scope of the present invention. As shown, the container may be portable, such that the container includes a carrying handle 112. The container may be configured to receive the carrying handle such that the carrying handle may be configured to attach to the container. The carrying handle allows the system to be handheld where the system can be carried by the carrying handle allowing the system to be portably used. The portability of the system allows it to be capable of being carried or moved, for example, to locations where otherwise a power source would not be readily available for use.

The container 102 may be made of any suitable material, such as a metal or a polymeric material. The container may comprise material having shock absorbing properties that absorb forces that would normally would have been transferred to the equipment within the container. Non-limiting examples of polymeric materials that may be used include acrylonitrile butadiene styrene (ABS plastic), polycarbonates, LEXAN™, MAKROLON™, polyethylene, and polypropylene, among other polymeric materials. Such polymeric materials may be produced via any suitable method, such as by CNC lathe, extrusion, a mold, and additive manufacturing, among others. Non-limiting examples of metals that may be used include carbon steel, stainless steel, aluminum, aluminum alloys, titanium, titanium alloys, among other metals and metal alloys. Such metal materials may be produced via any suitable method, such as by CNC lathe, extrusion, casting, welding, shearing, punching, welding, folding, etc. Other types of materials for containers and other methods for producing the same may also be used and are within the spirit and scope of the present invention.

Inside the container 102, there is an interior wall 105. On a first portion of the interior wall 105, a first standoff 106 is attached. In one embodiment, at least one first standoff 106 is attached to a first portion of the interior wall 105. On a second portion of the interior wall 105, a second standoff 107 is attached. In one embodiment, at least one second standoff 107 is attached to a second portion of the interior wall 105. In this regard, the first standoff 106 and second standoff 107 are generally attached to the interior wall 105 in such a way that the first standoff 106 and second standoff 107 oppose each other. A groove 111 is included in each standoff, where each groove 111 is configured to receive the rail defined by the plate 108 (discussed below).

The first standoff 106 may include at least one of the first top standoff (described below) and first bottom standoff (described below). The second standoff 107 may include at least one of the second top standoff and second bottom standoff. In one embodiment, the second top standoff is identical to the first top standoff and the second bottom standoff is identical to the first bottom standoff. In one embodiment, the first top standoff is identical to the first bottom standoff and the second top standoff is identical to the second bottom standoff. An identical standoff means the standoffs includes the same elements and are configured in the same respective manner, absent the standoff's respective attached location on the container.

The standoffs may be made of one or more suitable materials, such as a metal, a polymeric material, and combinations thereof. Non-limiting examples of polymeric materials that may be used include acrylonitrile butadiene styrene (ABS plastic), polycarbonates, LEXAN™, MAKROLON™, polyethylene, and polypropylene, among other polymeric materials. Such polymeric materials may be produced via any suitable method, such as by CNC lathe, extrusion, a mold, and additive manufacturing, among others. Non-limiting examples of metals that may be used include carbon steel, stainless steel, aluminum, aluminum alloys, titanium, titanium alloys, among other metals and metal alloys. Such metal materials may be produced via any suitable method, such as by CNC lathe, extrusion, casting, welding, shearing, punching, welding, folding, etc. Other types of materials for standoffs and other methods for producing the same may also be used and are within the spirit and scope of the present invention. The carrying handle may be made of any suitable material, such as a metal or a polymeric material including the materials which define the container.

The system 100 further includes a plate 108. In one embodiment, at least one piece of equipment is attached to the plate 108. The plate is a substantially planar shaped body. As illustrated, the plate 108 is attached to at least one piece of equipment 109a and 109b. The plate includes a rail. As shown the rail is defined by each side 110a, 110b of the plate 108. In other embodiments, the rail may be attached to each side 110a, 110b of the plate where the rail is configured to be received by at least one of the first standoff 106 and second standoff 107. The plate 108 may also include a handle (illustrated in FIG. 2B). For instance, a handle may be defined by a void portion or cutout of the plate 108 (e.g., produced via cutting a handle in the plate). Alternatively, the handle may be attached to the plate 108. The handle may be used to remove and insert the plate, with or without attached electronic equipment 109a, 109b into the container 102. The rail defined by the plate 108 may be securely received by a track to the top and bottom standoffs to hold the plate 108 and electric equipment 109a, 109b in place inside the container 102.

In other embodiments (not illustrated), the plate having a rail where the rail is not defined by the sides of the plate; rather, the rail is defined as a material attached to the sides of the plate 110a and 110b. The rail may be attached using fasteners consistent with this disclosure. In such an embodiment, the standoffs of the system are configured to receive the rail which is attached to the plate. The rail may be made of any suitable materials such as a metal, a polymeric material, and combinations thereof. Non-limiting examples of polymeric materials that may be used include acrylonitrile butadiene styrene (ABS plastic), polycarbonates, LEXAN™, MAKROLON™, polyethylene, and polypropylene, among other polymeric materials. Such polymeric materials may be produced via any suitable method, such as by CNC lathe, extrusion, a mold, and additive manufacturing, among others. Non-limiting examples of metals that may be used include carbon steel, stainless steel, aluminum, aluminum alloys, titanium, titanium alloys, among other metals and metal alloys. Such metal materials may be produced via any suitable method, such as by CNC lathe, extrusion, casting, welding, shearing, punching, welding, folding, etc. Other types of materials for standoffs and other methods for producing the same may also be used and are within the spirit and scope of the present invention. In other embodiments, the rail may be defined as including an attachment on one side of the plate 110a and defined by the side of the plate 110b. Thus, other configurations including at least a plate and a rail that are not expressly disclosed herein are also within the spirit and scope of the invention.

The equipment 109a and 109b may include electronic equipment where the electronic equipment may include electrical components (described below). In one embodiment the equipment 109a and 109b may include fragile equipment such that the equipment is susceptible to damage resulting from forceful impacts with objects. Therefore, the system is configured to protect the fragile equipment from damage by absorbing shock and distributing the forces of any such impact with a foreign object. The electronic equipment may include a power source in electrical communication with an inverter. The equipment may also include a power outlet. For example, in one embodiment, as shown, at least one piece of equipment is attached to the plate where the equipment 109a and 109b is both electronic equipment and fragile equipment. In one embodiment, for example, the equipment 109a and 109b is a power source and includes a power outlet (described below) that is in electrical communication with the equipment.

The tracks 205, 207 may be made of one or more suitable materials, such as a metal, a polymeric material, and combinations thereof. Non-limiting examples of polymeric materials that may be used include acrylonitrile butadiene styrene (ABS plastic), polycarbonates, LEXAN™, MAKROLON™, polyethylene, and polypropylene, among other polymeric materials. Such polymeric materials may be produced via any suitable method, such as by CNC lathe, extrusion, a mold, and additive manufacturing, among others. Non-limiting examples of metals that may be used include carbon steel, stainless steel, aluminum, aluminum alloys, titanium, titanium alloys, among other metals and metal alloys. Such metal materials may be produced via any suitable method, such as by CNC lathe, extrusion, casting, welding, shearing, punching, welding, folding, etc. The tracks 205, 207 may be defined by any suitable shape. For instance, in one embodiment, the track is a U-shaped track. In a particular embodiment, the track is a U-shaped aluminum track. Other types (e.g., shape) of tracks, other materials, and other methods for producing the same may also be used and are within the spirit and scope of the present invention. In other embodiments, the system does not include a track, such that the configuration of the standoffs, disclosed herein, support the rail. It is believed that a track may help stabilize the equipment such that the track provides resilient and shock absorbing properties to the system to prevent damage to the equipment resulting from daily use.

A lid (not illustrated) may be configured to attach to the open end 103 of the container 102, thereby defining a closed container. Closed containers are further described and illustrated in FIG. 6. The lid may be made of one or more suitable materials, such as a metal, a polymeric material, and combinations thereof. Non-limiting examples of polymeric materials that may be used include acrylonitrile butadiene styrene (ABS plastic), polycarbonates, LEXAN™, MAKROLON™, polyethylene, and polypropylene, among other polymeric materials. Such polymeric materials may be produced via any suitable method, such as by CNC lathe, extrusion, a mold, and additive manufacturing, among others. Non-limiting examples of metals that may be used include carbon steel, stainless steel, aluminum, aluminum alloys, titanium, titanium alloys, among other metals and metal alloys. Such metal materials may be produced via any suitable method, such as by CNC lathe, extrusion, casting, welding, shearing, punching, welding, folding, etc. Other types of materials for lids and other methods for producing the same may also be used and are within the spirit and scope of the present invention.

Figure 2A:
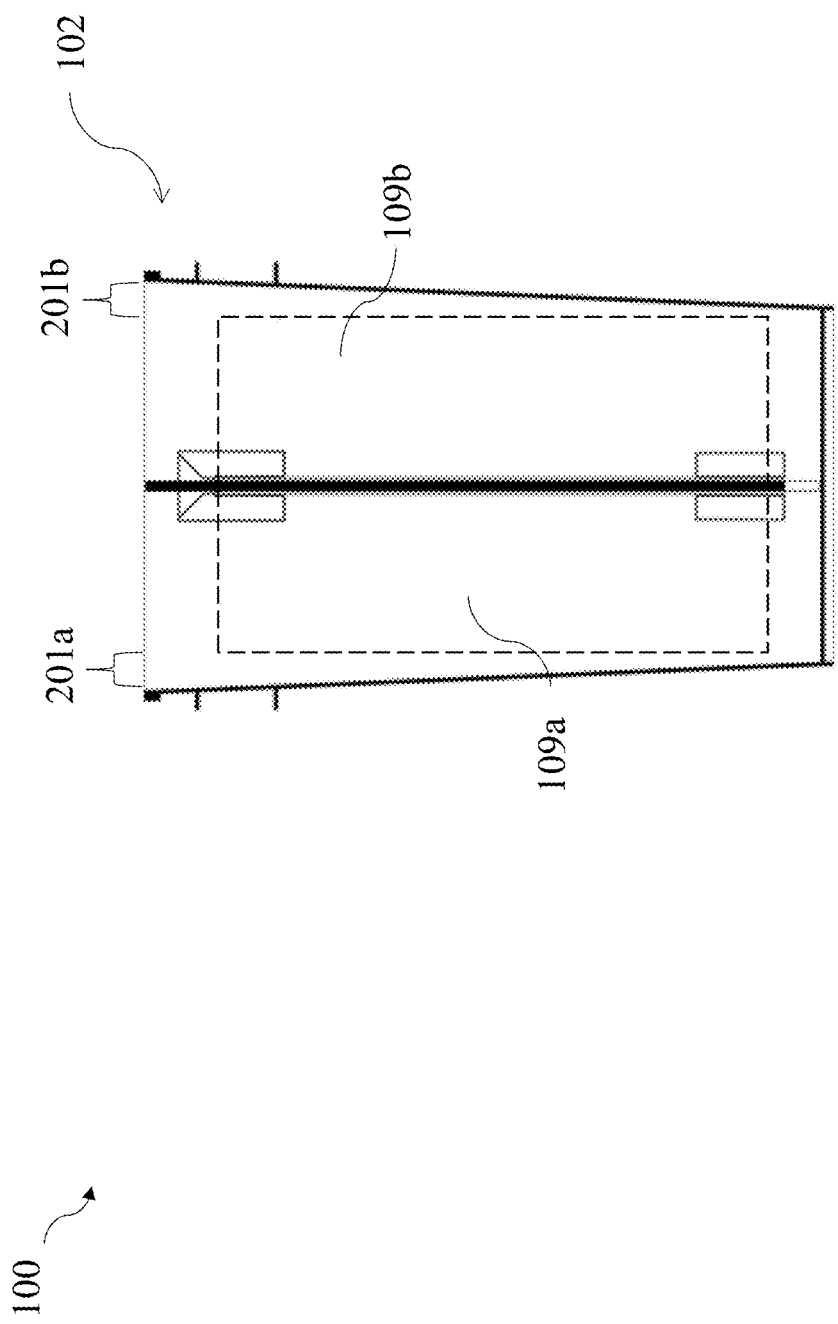
FIG. 2A is a cross-sectional side view of the system illustrating components of the system, according to an example embodiment.

Referring now to FIGS. 2A and 2B, a cross-sectional side view (FIG. 2A) and a cross-sectional front view (FIG. 2B) of the system illustrating components of a portable system 100 according to an example embodiment are illustrated. As illustrated, relief sections 201a and 201b are defined by an area between a perimeter of the electronic equipment 109a, 109b and the interior wall 105 of the container. Further, relief sections 201c, 201d are defined by an area between a perimeter 108 of the plate and the interior wall 105 of the container. The plate-mounted electronic equipment 109a, 109b are therefore disposed a distance away from the interior wall of the container.

It is believed that this configuration may provide resiliency and shock absorbing properties to equipment 109a and 109b during regular daily use of the system 100. Specifically, because the system is portable, the system may contact foreign objects such that the foreign object may exert a forceful impact on the system during daily use. The forceful impact may distribute shock or shock waves, throughout the system. The configuration of the system allows the container to resonate from impact and distribute the forces of shock and impact throughout the container. The container is made out of materials configured to have shock absorbing properties such that the material of the container reduces the amount of shock and the force of the impact that traverses the interior wall of the container and resonates throughout the inside of the container. The relief sections 201a and 201b allow shock waves that traverse the interior wall of the container to disperse within the void space of the interior of the container. Any shock waves that are not dissolved within the relief section will be transferred to the plate positioned within the interior of the container. The plate, as positioned within the interior, also includes shock absorbent properties such that the plate is made out of any suitable material, such as a metal or a polymeric material, configured to absorb shock and reduce the force of impact with foreign objects. Any remaining shock waves that are absorbed by the plate are also distributed back towards the top end and bottom end of container where the standoffs are positioned on the container. The distribution of shock back to the container protects the equipment from damage.

The plate is made out of any suitable material, such as a metal or a polymeric material, configured to absorb shock and reduce the force of impact with foreign objects. Non-limiting examples of polymeric materials that may be used include acrylonitrile butadiene styrene (ABS plastic), polycarbonates, LEXAN™, MAKROLON™, polyethylene, and polypropylene, among other polymeric materials. Such polymeric materials may be produced via any suitable method, such as by CNC lathe, extrusion, a mold, and additive manufacturing, among others. Non-limiting examples of metals that may be used include carbon steel, stainless steel, aluminum, aluminum alloys, titanium, titanium alloys, among other metals and metal alloys. Such metal materials may be produced via any suitable method, such as by CNC lathe, extrusion, casting, welding, shearing, punching, welding, folding, etc. Other types of materials for plates and other methods for producing the same may also be used and are within the spirit and scope of the present invention.

The portable system 100 may include a first standoff 202a positioned proximate to a top end 203 of the container and a first standoff 202b proximate to a bottom end 204 of the container 102. Furthermore, the system 100 includes a second standoff 206a positioned proximate to a top end of the container 102 and a second standoff 206b proximate to a bottom end of the container 102. A first track 205 spanning at least between the first standoffs 202a, 202b. A second track 207 spanning at least between the second standoffs 206a, 206b. The first track 205 and second track 207 are configured to receive the rail of the plate. In this way, the plate-mounted electronic equipment 109a, 109b are secured to the plate and in turn the plate is securely received by the first and second tracks 205, 207. The configuration fixes the plate-mounted electronic equipment 109a, 109b a fixed distance away (defined by the relief space) from the interior wall of the container 102. Thus, the plate-mounted electronics 109a, 109b are spatially fixed inside the container 102 and will not move to an appreciable extent during everyday use.

The standoff, including the first standoff, second standoff, first top standoff, first bottom standoff, second top standoff, and second bottom standoff, may be made out of any suitable material, such as a metal or a polymeric material, configured to absorb shock and reduce the force of impact with foreign objects. As illustrated, the standoffs are made out of polymeric material. Non-limiting examples of polymeric materials that may be used include acrylonitrile butadiene styrene (ABS plastic), polycarbonates, LEXAN™, MAKROLON™, polyethylene, and polypropylene, among other polymeric materials. Such polymeric materials may be produced via any suitable method, such as by CNC lathe, extrusion, a mold, and additive manufacturing, among others. Non-limiting examples of metals that may be used include carbon steel, stainless steel, aluminum, aluminum alloys, titanium, titanium alloys, among other metals and metal alloys. Such metal materials may be produced via any suitable method, such as by CNC lathe, extrusion, casting, welding, shearing, punching, welding, folding, etc. Other types of materials for plates and other methods for producing the same may also be used and are within the spirit and scope of the present invention.

The standoffs, as positioned on the container, may help distribute and direct shock waves from the plate to the container, directing the shockwaves away from the equipment. Because the standoffs are made of a material with shock absorbing or resilient properties, the standoffs may absorb the shock waves transferred to it and dilute the shock waves it further transfers to the system.

Figure 3B:
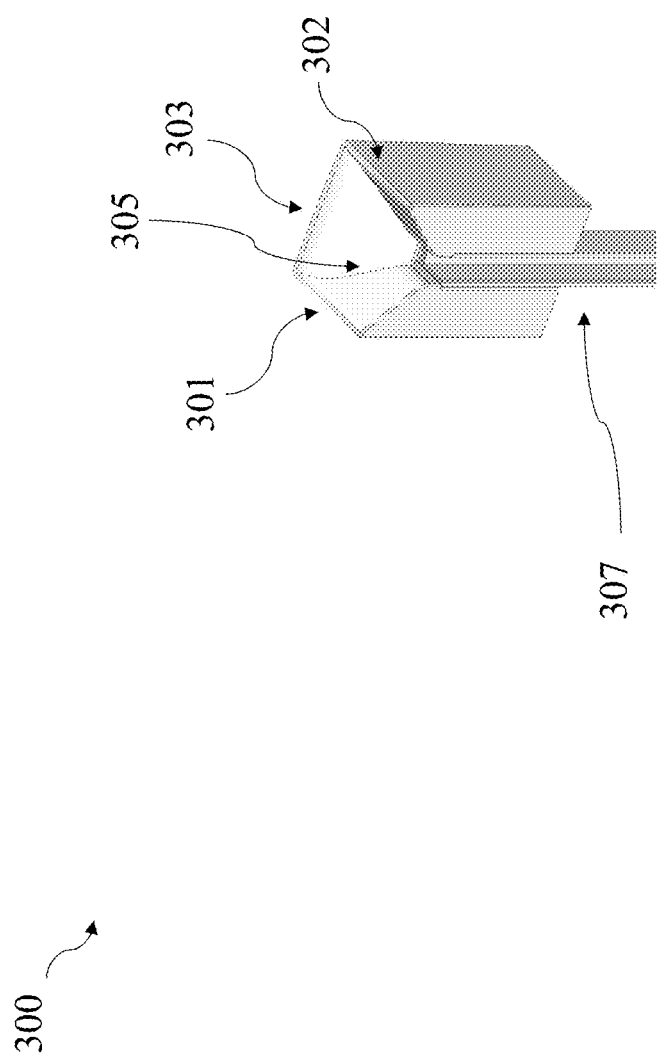
FIG. 3B is a detailed perspective view of a first top standoff of the system, according to an example embodiment.
Figure 4A:
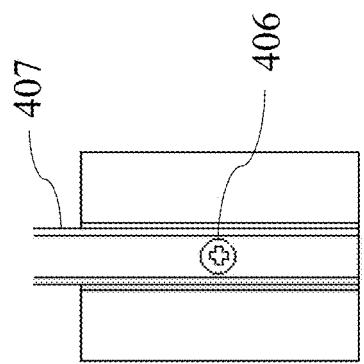
FIG. 4A is a detailed front view of a first bottom standoff of the system, according to an example embodiment.
Figure 4B:
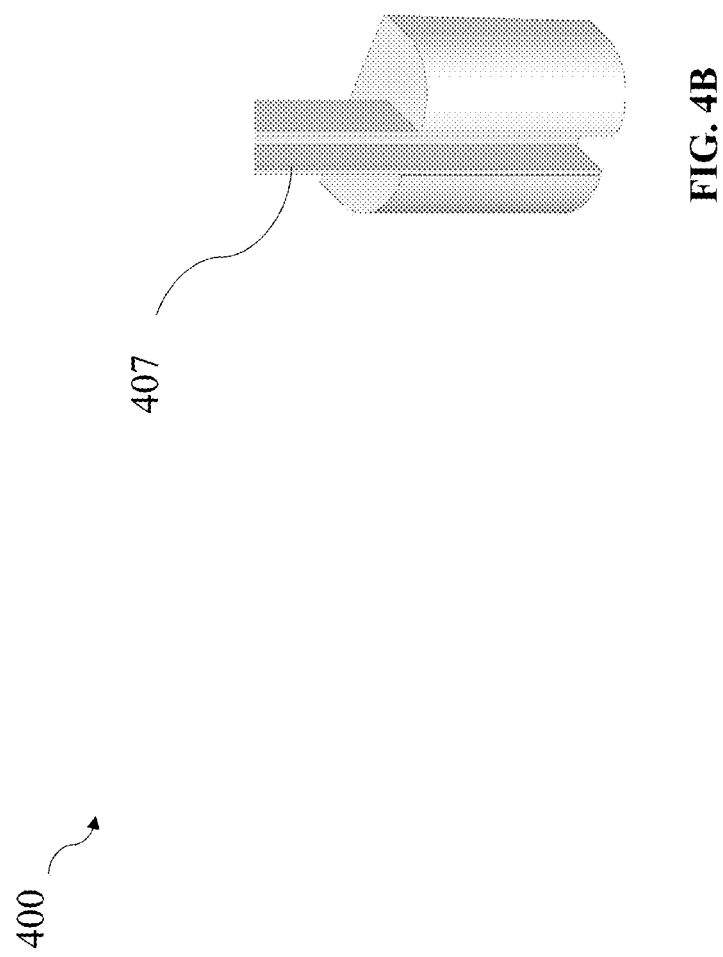
FIG. 4B is a detailed perspective view of a first bottom standoff of the system, according to an example embodiment.

As illustrated in FIGS. 2A and 2B above, the portable systems 100 described herein generally include at least one top and bottom standoffs 202, 206 on first and second portions of an interior wall of a container 102. Between the top and bottom standoffs 202, 206 on each portion of the interior wall, a track 205, 207 spans between the standoffs 202, 206 that is configured to receive the rail defined by the plate. The spatial arrangement of these components defines the relief areas between the interior wall of the container and the perimeter of the components. The relief areas may help confer resilient and shock absorbing properties to the portable system, which may help protect the plate-mounted electronic equipment 109a, 109b therein during everyday use. In this regard, an embodiment of a detailed top standoff is illustrated in FIGS. 3A-3B and an embodiment of a detailed bottom standoff is illustrated in FIGS. 4A-4B. These embodiments are discussed in further detail below.

In other embodiments, the system may include two standoffs, such as a first standoff positioned across from a second standoff. Such first and second standoff may be positioned on the center of the interior wall of the container equidistantly proximate to the open end of the container and the closed end of the container. In other embodiments (not illustrated), the system may include three standoffs, such that a first standoff opposes two second standoffs where the first standoff may be positioned on the center of the interior wall of the container equidistantly proximate to the open end of the container and the closed end of the container and the second standoffs may be positioned proximate to the open end of the container and the closed end of the container, respectively. Other embodiments may contain multiple standoffs positioned along the interior wall of the container configured to receive the rail of the plate. Thus, other configurations including at least two portable systems that are not expressly disclosed herein are also within the spirit and scope of the invention.

It may be preferable for any wiring used to connect the equipment 109a, 109b to be placed at the bottom end 294 of the container 102. In this way, a cutout may be defined at a bottom end of the plate 108. In one embodiment, a cutout 208 defined at a bottom end of the plate 108 is configured to allow wires and other items to pass between a first side and a second side of the plate when the system is in a fully assembled configuration. In one embodiment, the equipment 109a, 109b includes at least a power source in electrical communication with an inverter. In one embodiment, first electric component 109a and second electric component 109b are both power sources. In such embodiments, electrical communication may be provided via one or more wires, and the one or more wires connecting the power source and inverter may pass from a first side of the system to a second side of the system via cutout 208. The cutout allows the equipment to span between a first side of the plate and a second side of the plate. Through the cutout, electrical components of the equipment, including wiring, may span from one side of the system to the other side of the system by passing through the cutout. In other embodiments (not illustrated), the cutout may be in the center of the plate where the cutout allows a portion of the equipment to span between a first side of the plate and a second side of the plate. In other embodiments, the cutout may be defined as a relief section on the side of a plate, where such cutout is not received by the standoffs or track, in order to allow equipment and electrical components to span or pass through from a first side of the container to a second side of the container. Thus, other configurations including a cutout or relief section in the plate that are not expressly disclosed herein are also within the spirit and scope of the invention.

In one embodiment (not illustrated), at least two portable systems are in electrical communication with one another. For instance, a first portable system may include an inverter and a first power source, and the second portable system may include a second and third power source. The first and second portable systems may be in electrical communication in parallel or in series. In this way, a plurality of configurations of a plurality of portable systems may be in electrical communication. Thus, other configurations including at least two portable systems that are not expressly disclosed herein are also within the spirit and scope of the invention.

In one embodiment, an electrical component is a power source. Power sources such as rechargeable batteries may be used. In one embodiment, a power source is a battery. In one embodiment, a power source is a solar panel. In one embodiment, a power source is a lithium-ion battery. Suitable types of lithium-ion batteries may include Lithium Cobalt Oxide-, Lithium Nickel Manganese Cobalt Oxide-, Lithium Nickel Cobalt Aluminum Oxide-, Lithium Titanate-, and Lithium Iron Phosphate-type batteries, among others. Other types of rechargeable batteries may include, sealed lead acid (SLA) batteries, nickel metal hydride batteries, and nickel cadmium acid batteries, among others. In one embodiment, a power source is a 48-Volt, 20-Ampere-Hour, lithium-ion battery. Other types of batteries and power sources are also within the spirit and scope of the invention.

With reference now to FIGS. 3A-3B, a detailed embodiment of a first top standoff 300 is shown. As illustrated, the first top standoff 300 includes a first receiving portion 301, a second receiving portion 302, and a third receiving portion. The receiving portions 301, 302, 303 taper downward from a top end 304 of the standoff 300 to define a mounting plate guideway. The mounting plate guideway 305 aids the consumer in placing a plate (not illustrated) into the first top standoff, reducing the required precision required to place the plate into the tracks. As illustrated, the first top standoff 300 is fastened to an upper portion of the track 307 via a first fastener 306. The first fastener may attach at least one of the first standoff and second standoff.

With reference now to FIGS. 4A-4B, a detailed embodiment of a first bottom standoff 400 is shown. First bottom standoff 400 connects to a bottom portion of the track 407 via a second fastener 406. Any suitable material type of fastener 306, 406 may be used. For instance, suitable fasteners include a suction cup, hooks, bolt, set crews, an opening configured to attached to a protruding element, socket screws, U-bolts, twine, etc. In the illustrated embodiment, the fastener 306 is a mounting bolt. However, other types of fasteners may also be used and are within the spirit and scope of the present invention. Fasteners may be made of any suitable material, such as a metal, a polymeric material, and combinations thereof. Non-limiting examples of polymeric materials that may be used include acrylonitrile butadiene styrene (ABS plastic), polycarbonates, LEXAN™, MAKROLON™, polyethylene, and polypropylene, among other polymeric materials. Non-limiting examples of metals that may be used include carbon steel, stainless steel, aluminum, aluminum alloys, titanium, titanium alloys, among other metals and metal alloys. Other types of materials for fasteners may also be used and are within the spirit and scope of the present invention.

Figure 5:
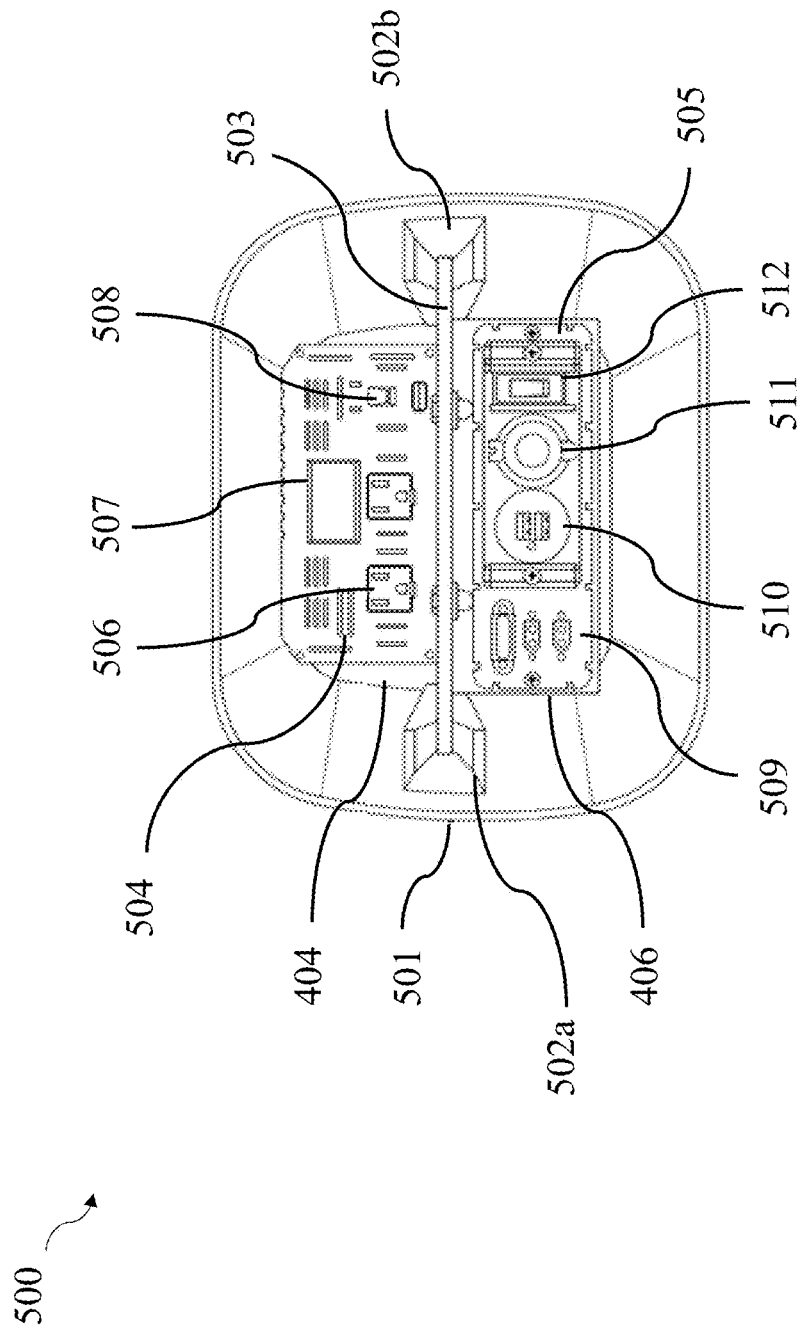
FIG. 5 is a top view of the system illustrating equipment of the system, according to an example embodiment; and, FIG. 6 is a perspective view of the system illustrating a lid configured to attach to an open end of a container defining a closed handheld container, according to an example embodiment.

With reference now to FIG. 5, a top view of a portable system 500 illustrating electronic components of the system according to an example embodiment is shown. Portable system 500 includes a container 501 having an open end and a terminating or closed end and having an interior wall inside the container. The system 500 includes a first standoff 502a attached to a first interior wall portion and a second standoff 502b attached to a second interior wall portion. As illustrated, the first standoff 502a and second standoff 502b are in a configuration where they oppose each other. The system 500 further includes a plate 503, where a rail is defined by each side of the plate. Moreover, each standoff 502a, 502b includes a groove, where each groove is configured to receive the rail defined by the plate. system 500 includes equipment which may include a first electric component 504, a 1000-Watt pure sine wave inverter, and second electric component 505, a 48-Volt, 20-Ampere-Hour, lithium-ion battery. The equipment may also include, as illustrated, an inverter 504 which has a variety of components, such as dual 120-Volt USA-style sockets 506, a liquid crystal display (LCD) 507, and a switch 508 to control the flow of 120-Volt electricity. The lithium-ion battery 505 includes two XT-60 charge ports having a 10-ampere max 509, two USB ports 510, a 12-Volt 200-Watt socket 511, and a switch 512 to control the flow 12-Volt electricity. Both the inverter 504 and lithium-ion battery 505 are attached to the plate 503. Furthermore, the inverter 504 and lithium-ion battery 505 are in electrical communication via wiring that runs through a cutout defined at a bottom end of the plate 505 when the handheld system 500 is in a fully assembled configuration. The cutout is not illustrated in FIG. 5; however, an exemplary embodiment of a cutout is provided by FIG. 2B, discussed in greater detail above. The inverter 504 and lithium-ion battery 505 may be protected via the relief sections that are defined by the void space between the interior wall of the handheld container 501 and the perimeter of each the inverter 504 and lithium-ion battery 505. It is believed that the relief sections confer resiliency and shock absorbing properties to electric components 504, 505 of the portable system 501. For instance, it is believed that due to the configuration of the portable system 500, the electric components 504, 505 will be reduce the impact of everyday usage of the portable system 500. Lastly, the portable system 500 may comprise a lid (not illustrated) configured to attach to the open end of the container 501.

Figure 6:
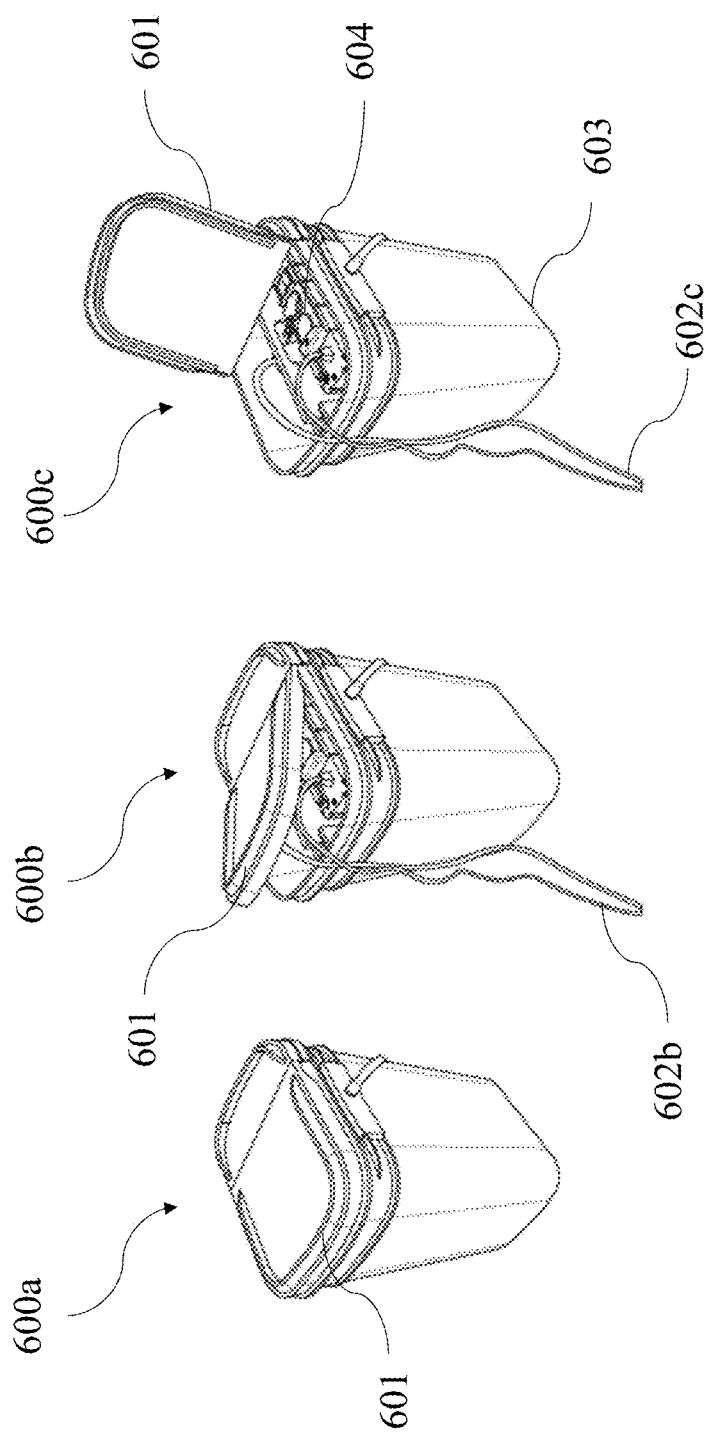

With reference now to FIG. 6, a perspective view of a system 100 illustrating a lid 601 configured to attach to an open end of a container according to an example embodiment is shown. Three configurations are shown: a fully closed configuration 600a, a partially open configuration 600b, and a completely open configuration 600c. The partially open 600b and completely open configuration 600c illustrate wires 601b, 601c disposed within the systems 600b, 600c and outside the systems 600b, 600c. As illustrated, the lid 601 is configured to attach to an open end of a container defining a closed handheld container.

Figure 7:
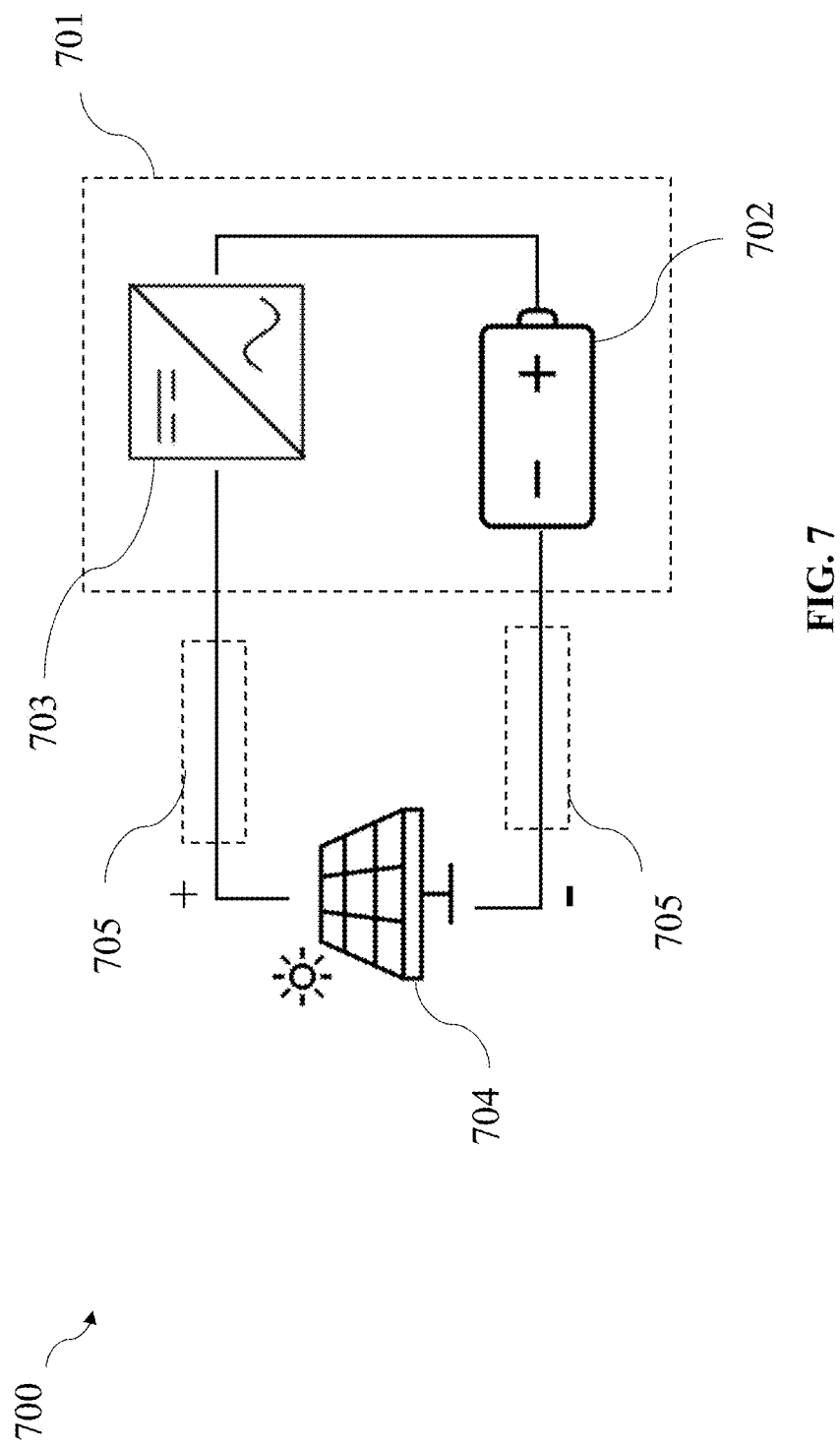
FIG. 7 illustrates a diagram of an electrical configuration of the system, according to an example embodiment.

With reference now to FIG. 7, a diagram of the electrical configuration of the system is illustrated, according to an example embodiment. The electrical configuration includes a solar panel 704 in electrical communication with the portable system illustrated as portable system 701. The portable system 701 having electronic equipment including inverter 703 and a power source 702. The solar panel is operationally coupled to the portable system via the connector 705 such the solar panel is in electrical communication with the equipment. In one embodiment, the system may include multiple solar panels (not illustrated) such a first solar panel is in parallel with a second solar panel. In another embodiment, the system may include a first solar panel in series with a second solar panel. Thus, other configurations including at least two solar panels that are not expressly disclosed herein are also within the spirit and scope of the invention.

Figure 8A:
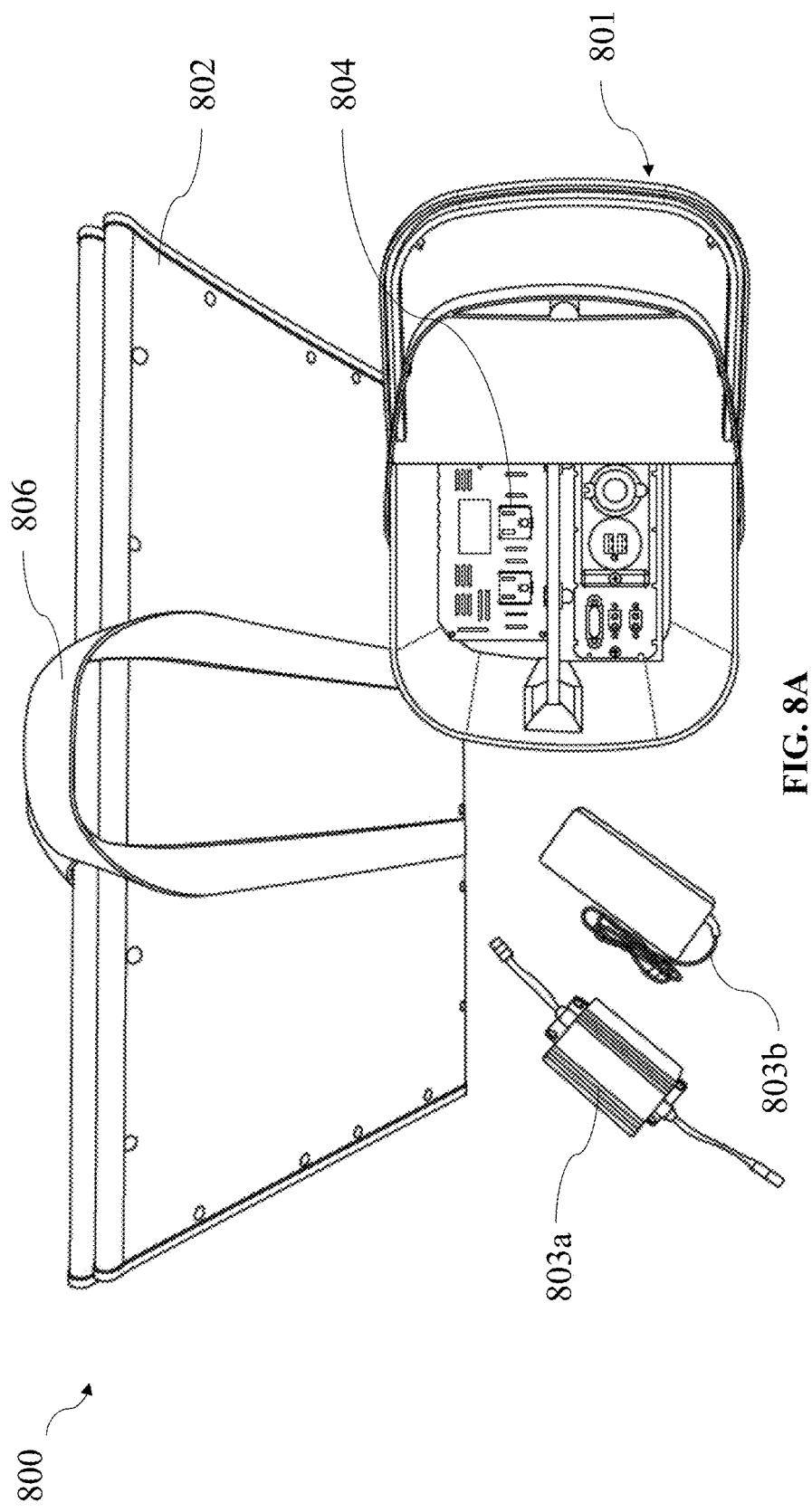
FIG. 8A is a perspective view of a kit, including the portable system, a solar panel, and a connector, according to an example embodiment.
Figure 8B:
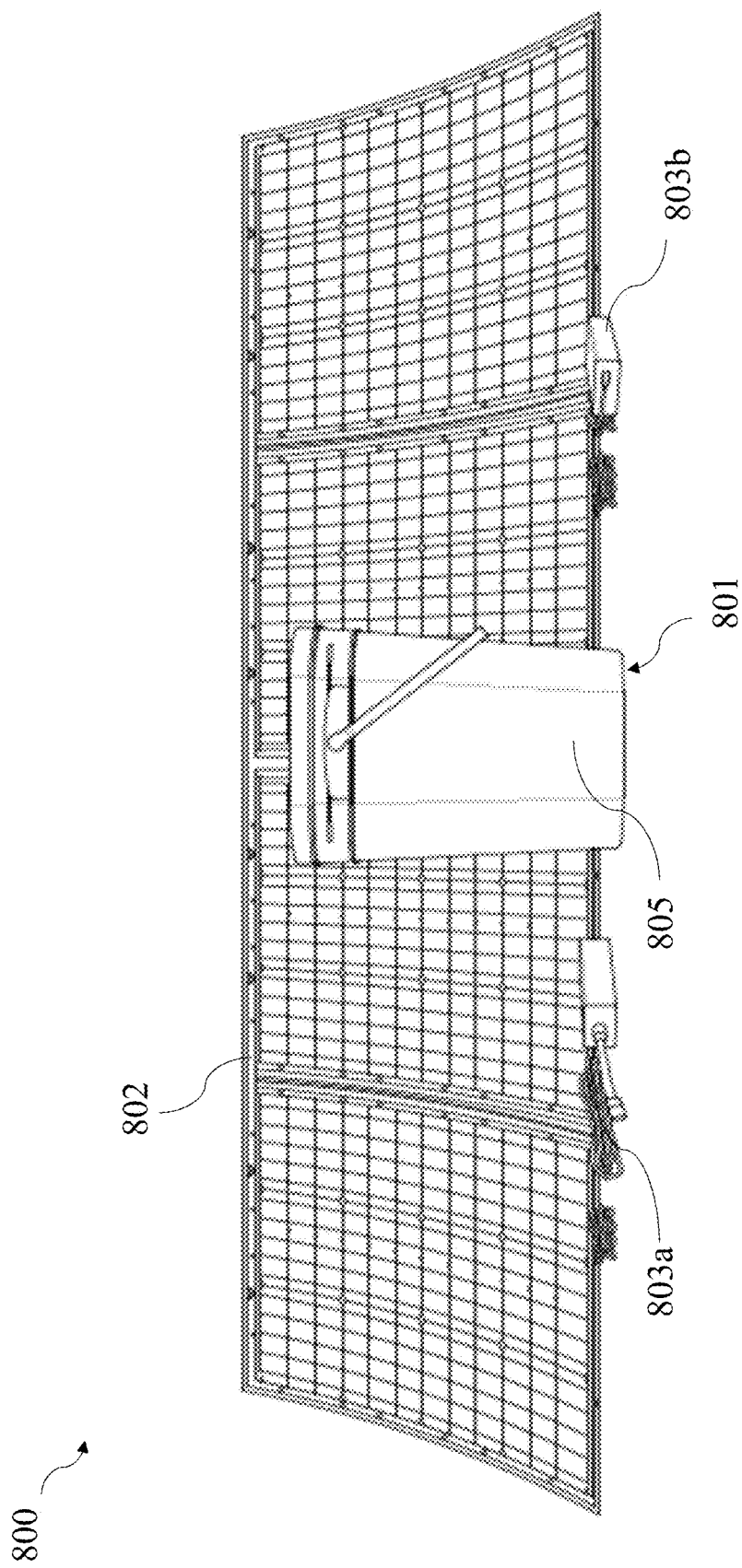
FIG. 8B is a side view of a kit, including the portable system, a solar panel, and a connector, according to an example embodiment

With reference now to FIG. 8A and FIG. 8B, a kit 800 including a solar panel 802 and a portable system 801 for absorbing shock and carrying equipment is shown. The kit may include the portable system 100 illustrated as portable system 801. The kit may also include at least one solar panel 802 and a connector (803a, 803b) where the connector is configured to operationally couple the solar panel to the portable system. Specifically, the connector couples the solar panel to the portable system such that the solar panel is in electrical communication with the equipment of the portable system. A portion of the connector 803a is configured to connect to the solar panel. A portion of the connector 803b is configured to connect to the portable system. Specifically, the connector may be configured to connect to the equipment.

The portable system 801 may include at least one power outlet 804. In one embodiment, as illustrated in FIG. 8, the at least one power outlet may be accessible through the open end of the container of the portable system such that power outlet 804 is positioned within the interior of the container. The power outlet 804 is configured to receive the connector such that an end of the connector is plugged into the power outlet and an opposing end of the connector is configured to attach to the solar panel.

The at least one solar panel may also be portable and handheld, such that the solar panel may include a handle 806. The handle 806 may be made of any suitable material and include handles such as leather and synthetic handles, fabric handles, wooden handles, metal handles, rope handles, and plastic handles. The solar panel is in electrical communication with the portable system via the connector. Specifically, the solar panel is in electrical communication the equipment of the portable system, which may include the electronic equipment and electrical components. In embodiments where the equipment of the portable system is a power source, the solar panel is in electrical communication with the power source such that the solar panel may provide charge to the power source. The solar panel may also configure as a power source to the portable system, such that power source of the portable system includes the solar panel in electrical communication with the equipment. The solar panel may provide power to equipment of the portable system and tools plugged into the power outlet. The power outlet may be in electrical communication with the power source and the solar panel. The power outlet may be operationally coupled to the solar panel via the connector such that the power outlet is configured to receive the connector. The power outlet may include 120-Volt USA-style sockets 506 as depicted in FIG. 5.

In one embodiment (not illustrated), at least two solar panels are in electrical communication with one another. For instance, a first kit may include a first solar panel, a first connector, and a first portable system having an inverter and a first power source, and the second kit may include a second solar panel. The first and second solar panel may be in electrical communication in parallel or in series. In this way, a plurality of configurations of a plurality of kits may be in electrical communication. Thus, other configurations including at least two solar panels that are not expressly disclosed herein are also within the spirit and scope of the invention.

Figure 9:
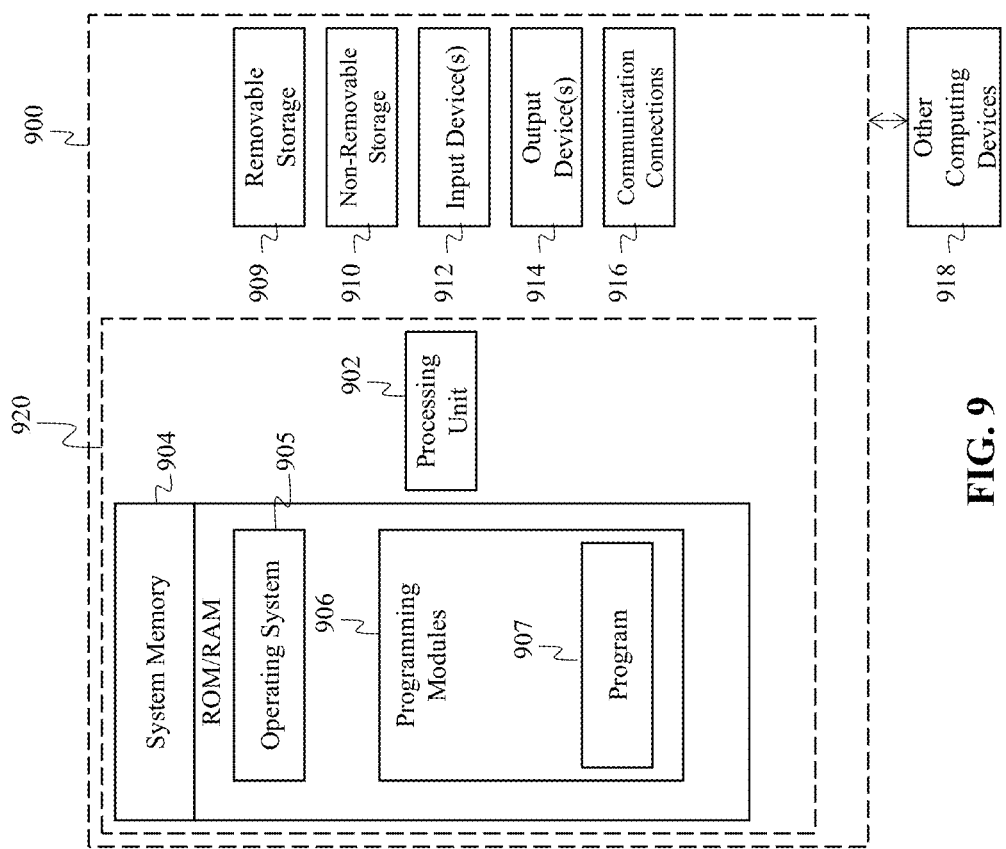
FIG. 9 illustrates a block diagram of a computer system according to exemplary embodiments of the present technology, according to an example embodiment.

With reference now to FIG. 9, a block diagram of a system including an example computing device 900 and other computing devices is shown. Consistent with the embodiments described herein, the equipment of the system may contain a computing device, such as the computing device 900 of FIG. 9. The computing device may be fragile and electrical equipment susceptible to damage resulting from shock waves and impacts with foreign objects during daily use. Any suitable combination of hardware, software, or firmware may be used to implement the computing device 900. The aforementioned system, solar panel, equipment, and power source are examples and other systems, devices, and processors may comprise the aforementioned computing device. Furthermore, computing device 900 may comprise an operating environment for system 100. Processes, data related to system 100 may operate in other environments and are not limited to computing device 900.

A system consistent with an embodiment of the disclosure may include a plurality of computing devices, such as computing device 900. In a basic configuration, computing device 900 may include at least one processing unit 902 and a system memory 904. Depending on the configuration and type of computing device, system memory 904 may comprise, but is not limited to, volatile (e.g., random access memory (RAM)), non-volatile (e.g., read-only memory (ROM)), flash memory, or any combination or memory. System memory 904 may include operating system 905, and one or more programming modules 909. Operating system 905, for example, may be suitable for controlling computing device 900's operation. Furthermore, embodiments of the disclosure may be practiced in conjunction with a graphics library, other operating systems, or any other application program and is not limited to any particular application or system. This basic configuration is illustrated in FIG. 9 by those components within a dashed line 920.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable, and non-removable media implemented in any method or technology for storage of information, such as computer readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 900. Any such computer storage media may be part of system 900. Computing device 900 may also have input device(s) 912 such as a keyboard, a mouse, a pen, a sound input device, a camera, a touch input device, etc. Output device(s) 914 such as a display, speakers, a printer, etc. may also be included. The aforementioned devices are only examples, and other devices may be added or substituted.

Computing device 900 may also contain a communication connection 916 that may allow system 100 to communicate with other computing devices 99, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 904, including operating system 905. While executing on processing unit 902, programming modules 909 (e.g., program module 907) may perform processes including, for example, one or more of the stages of a process. The aforementioned processes are examples, and processing unit 902 may perform other processes. The aforementioned processes are examples, and processing unit 902 may perform other processes and may also be configured to provide a user interfaces displayed associated with devices explained above. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit including discrete electronic elements, packaged, or integrated electronic chips containing logic gates, a circuit utilizing a microprocessor, or on a single chip (such as a System on Chip) containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages, and/or inserting or deleting stages, without departing from the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A portable system for absorbing shock and carrying electronic equipment, where the system comprises:
   a container having an open end, a closed end, and an interior wall;
   a first top standoff attached to a first interior wall portion;
   a second top standoff attached to a second interior wall portion such that the first top standoff and the second top standoff oppose each other;
   a plate on which at least one piece of the electronic equipment is attached;
   the plate comprising a rail;
   a relief section defined by an area between the interior wall of the container and at least one of a perimeter of the plate and a perimeter of the electronic equipment;
   a groove in each standoff, where each groove is configured to receive the rail;
   a first bottom standoff positioned proximate to the closed end of the container;
   a first track spanning at least between the first top standoff and the first bottom standoff;
   a second bottom standoff positioned proximate to the closed end of the container;
   a second track spanning at least between the second top standoff and the second bottom standoff; and
   where the first track and the second track are configured to receive the rail.

2. The system of claim 1, where the container is a bucket.

3. The system of claim 1, where the electronic equipment comprises a power outlet.

4. The system of claim 1, where the electronic equipment comprises a power source in electrical communication with an inverter.

5. The system of claim 1 comprising an opening in the plate defining a handle to remove and insert the plate and the electronic equipment out of and into the container.

6. The system of claim 1, where the container is portable, such that the container comprises a handle.

7. The system of claim 1, where the plate comprises a cutout configured to allow the electronic equipment to pass between a first side of the plate and a second side of the plate.

8. The system of claim 1, where a first fastener attaches at least one of the first top standoff, the first bottom standoff, the second top standoff, and the second bottom standoff to the container.

9. The system of claim 1, further comprising a lid configured to attach to the open end of the container.

10. A kit comprising a solar panel and a portable system for absorbing shock and carrying electronic equipment, where the kit system comprises:
    a container having an open end, a closed end, and an interior wall;
    a first top standoff attached to a first interior wall portion;
    a second top standoff attached to a second interior wall portion such that the first top standoff and the second top standoff oppose each other;
    a plate on which at least one piece of the electronic equipment is attached;
    the plate comprising a rail;
    a relief section defined by an area between the interior wall of the container and at least one of a perimeter of the plate and a perimeter of the electronic equipment;
    a groove in each standoff, where each groove is configured to receive the rail;
    at least one solar panel;
    a connector configured to operationally couple the at least one solar panel to the portable system;
    a first bottom standoff positioned proximate to the closed end of the container;
    a first track spanning at least between the first top standoff and the first bottom standoff;
    a second bottom standoff positioned proximate to the closed end of the container;
    a second track spanning at least between the second top standoff and the second bottom standoff; and
    where the first track and the second track are configured to receive the rail.

11. The system of claim 10, where the plate comprises a cutout configured to allow the electronic equipment to span between a first side of the plate and a second side of the plate.

12. The system of claim 11, where the at least one solar panel comprises a handle.

13. The system of claim 12, where the electronic equipment comprises a power outlet accessible from the open end of the container.

14. A portable system for absorbing shock and carrying electronic equipment, where the system comprises:
    a container having an open end; a closed end; and an interior wall;
    a first top standoff attached to a first interior wall portion;
    a second top standoff attached to a second interior wall portion such that the first top standoff and the second top standoff oppose each other;
    a plate on which at least one piece of the electronic equipment is attached;
    the plate comprising a rail;
    a relief section defined by an area between the interior wall of the container and at least one of a perimeter of the plate and a perimeter of the electronic equipment;
    a groove in each standoff, where each groove is configured to receive the rail;
    a power source;
    at least one power outlet;
    a first bottom standoff positioned proximate to the closed end of the container;
    a first track spanning at least between the first top standoff and the first bottom standoff;
    a second bottom standoff positioned proximate to the closed end of the container;
    a second track spanning at least between the second top standoff and the second bottom standoff; and,
    where the first track and the second track are configured to receive the rail.

15. The system of claim 14, where the power source is a solar panel in electrical communication with the electronic equipment.

16. The system of claim 15, where the at least one power outlet is accessible from the open end of the container such that the at least one power outlet is positioned within the interior of the container.

17. The system of claim 16, where the plate comprises a cutout at the bottom end of the plate providing an opening configured to allow a portion of the electronic equipment to span between a first side of the plate and a second side of the plate.

18. The system of claim 17, where the system is portable such that a handle is attached to at least one of the container and the power source.

* * * * *